United States Patent Office 2,733,003
Patented Jan. 31, 1956

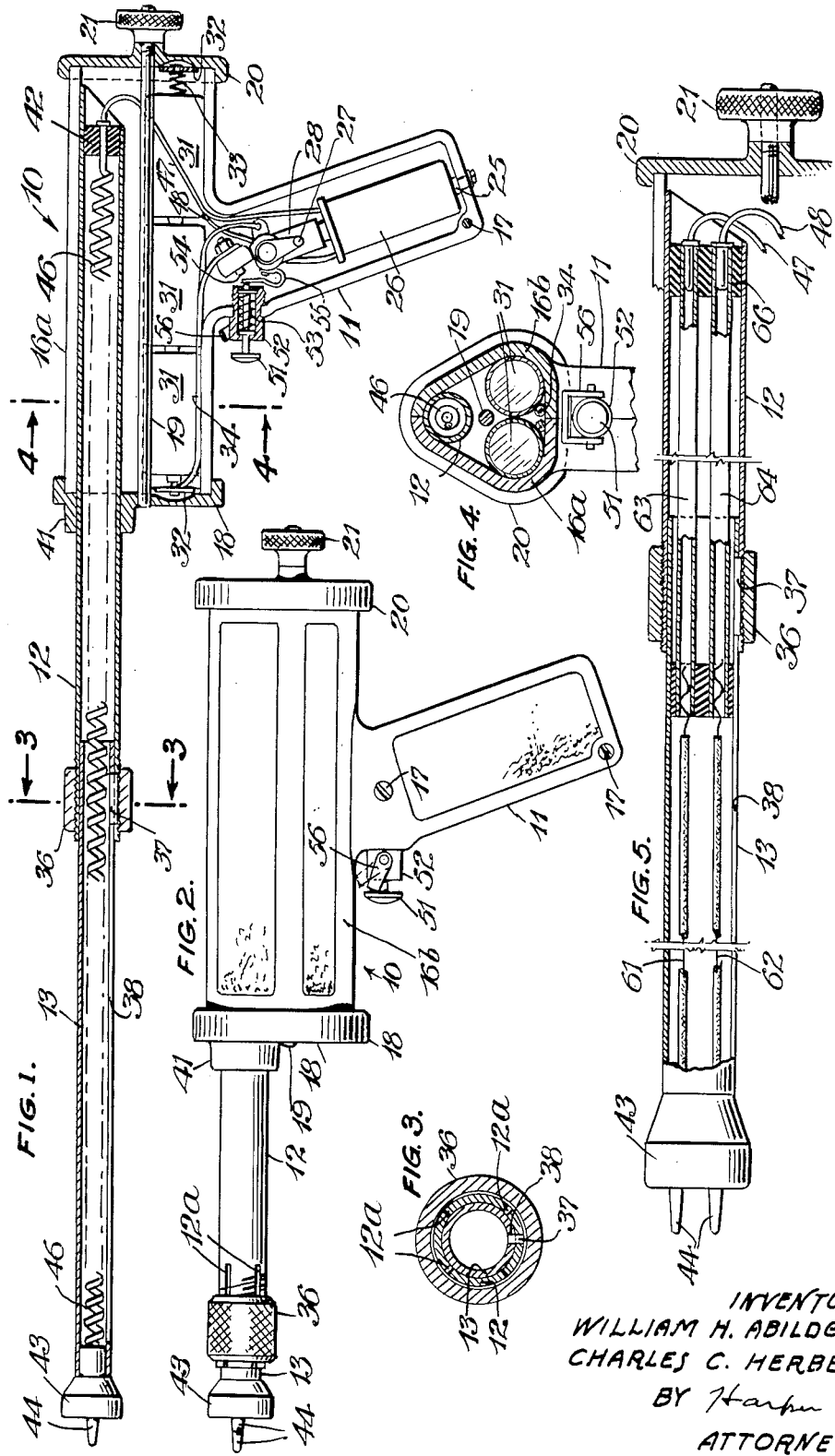

2,733,003

LIVESTOCK PROD

William H. Abildgaard, Santa Maria, and Charles C. Herbert, Watsonville, Calif., assignors to Livestock Sprayer Mfg. Co., San Jose, Calif., a corporation of California Application January 12, 1953, Serial No. 330,852

4 Claims. (Cl. 231—2)

The present invention relates to an electric prod for livestock and is concerned more particularly with a prod in which the weight is advantageously distributed, which can be carried conveniently, and which can be used either as a long prod or as a short prod.

Prods of this type commonly are built as a long tubular member which is of fixed length, which has the weight distributed undesirably and which cannot be carried conveniently.

In accordance with the present invention, an electric prod is provided having a pistol grip handle and having a collapsible or telescopic prod section extending therefrom so that it can be extended for use as a long prod, or shortened for use as a short prod or for carrying.

The above and other objects of the invention are attained as disclosed in connection with certain preferred embodiments thereof as illustrated in the accompanying drawings, in which:

Figure 1 is a vertical longitudinal section through an electric prod representing our invention.

Figure 2 is a side elevation showing the prod in a position of shortened length.

Figure 3 is a sectional view taken on the line 3—3 in Figure 1.

Figure 4 is a sectional view taken on line 4—4 in Figure 1.

Figure 5 is a vertical sectional view similar to Figure 1 but showing a modified form of the invention.

Referring to the drawings, there is shown a prod including a body 10 having a pistol grip handle 11 thereon and projecting forwardly therefrom a tube 12. The tube 12 forms part of the collapsible extension and receives a smaller tube 13. The body and handle portion of the pistol grip prod are formed as two complementary halves by molding or casting, and the respective halves 16a and 16b are secured together by fastening screws or studs 17. At the ends of the body respective covers 18 and 20 are provided which are recessed to engage over the body halves 16a and 16b and aid in securing them together. The rear cover 20 is apertured to pass a rod 19 which is secured at its other end in the front cover 18. A knurled nut 21 is threaded on the end of the rod 19 to secure the parts in assembled position.

Preferably the body and its handle portion of the prod are utilized to house the low voltage battery supply and the high voltage induction coil. The induction coil 26 is secured in the handle portion 11 by means of a mounting stud 25 and is of conventional construction including vibrator points 27 and breaker point spring 28. Any conventional coil such as the ignition coil for automobile engines may be used. Above the handle portion and in the lower portion of the body 10 is provided a tubular mounting for two parallel rows of batteries 31 each row of batteries being mounted in conventional end-to-end fashion. Suitable insulating members 32 of fibre are provided at the respective ends of the rows of batteries, and a spring 33 of conventional type is provided at the end of each row. The batteries are electrically connected in conventional manner to the induction coil 26 by means including a pair of insulated electrical leads 34.

The upper portion of the housing 10 provides a space for receding of the movable part or tube 13 of the prod extension and for this purpose the tube or sleeve 12 is secured in place in a boss 41 of the front cover 18. The outer end of the tube 12 is slit at 12a and is threaded externally to receive a knurled clamping nut 36 by means of which the end of the tube 12 can be secured in clamping engagement about the tube 13. To prevent relative rotation between the tubes 12 and 13 and limit endwise movement of tube 13, a key 37 seated in tube 12 engages a longitudinal slot 38 in tube 13. At the outer end of the tube 13 a conventional two-pointed prod element 43 is mounted having two extensions or contact points 44 which are connected to two secondary leads which carry suitable insulation wound together to form a spiral coil 46 of extensible and retractible character. This spiral coil extends rearwardly through the tube 12 to an insulating plug 42, where the two wires are connected to respective insulated leads 47 and 48 from the coil 26.

For operation of the prod a trigger-button 51 of insulating material is carried by a grooved mounting sleeve 52 secured in the handle portion 11 and having a spring 53 which urges the trigger-button to its outward position. When pressed inwardly, the trigger-button engages a U-shaped contact element 55 connected to an input terminal of the coil 26 and moves the element 55 to engage a contact 54 and complete the circuit of the batteries and effect a high voltage discharge across the prod points 44. A safety member 56 of U shape is pivoted on the sleeve 52 so as to be moved downwardly and block circuit closing movement of the trigger-button 51.

In the modification shown in Figure 5, the two leads from the prod points 44 are formed of straight substantially rigid wires 61 and 62 covered with insulation. The curved rearward ends of these wires are bare and are received in respective copper tubes 63 and 64 carrying a fibre guide plug at their outer ends and mounted in the tube 12 by a fibre plug 66 at the rear. The copper tubes 63 and 64 are connected respectively to the high tension leads 47 and 48 and as the tube 13 recedes into the tube 12, the wires slide rearwardly in the copper tubes 63 and 64 maintaining the electrical connection.

While we have shown certain preferred embodiments of the invention, it will be apparent that the invention is capable of further modification and that its scope should be limited only by the scope of the claims appended hereto.

We claim:

1. In an electric prod for livestock, a body including a pistol grip handle portion, a tube secured in the body and extending forwardly therefrom, a second tube slidably received by said first tube for adjustable positioning in either retracted or extended position with respect thereto, the retracted position of said second tube including positioning of a portion thereof within said body, contact elements projecting outwardly from said second tube, extensible electric lead means extending from said contact elements through said tubes, and electrical means in said body connected to said lead means for producing an electrical potential.

2. In an electric prod for livestock, a body structure including a tubular portion, a tubular prod extension telescopically received within said tubular portion and telescopically adjustable with respect to said tubular portion between a retracted position and an extended position, means providing an adjustable connection between said tubular extension and said tubular portion, contact means carried by said extension, and means for providing a potential at said contact means including extensible electric lead means extending from said contact means to said body structure.

3. In an electric prod for livestock, a body structure including a pistol grip handle and a tubular portion, a tubular extension telescopically received within said tubular portion, means providing an adjustable connection between said tubular extension and said tubular portion, contact means carried by said extension, and means for providing a potential at said contact means including extensible electric lead means extending from said contact means to said body structure and a contact trigger carried by said body structure.

4. In an electric prod for livestock, an elongated body structure having a handle portion projecting downwardly therefrom to form a pistol grip handle, said body portion and said handle being of hollow construction, a prod extension extending longitudinally from said body portion in the direction of the elongation thereof carrying contact means for engagement with livestock, means for producing an electrical potential at said contact means including battery means and coil means housed by said body portion, and a contact trigger on said body portion adjacent said handle, said prod extension being of telescopic construction.

References Cited in the file of this patent

UNITED STATES PATENTS

| | | |
|---|---|---|
| 1,158,473 | Floyd | Nov. 2, 1915 |
| 2,180,665 | Bruggerman | Nov. 21, 1939 |
| 2,507,736 | Ritchie et al. | May 16, 1950 |
| 2,561,122 | Juergens | July 17, 1951 |
| 2,570,762 | Caliri | Oct. 9, 1951 |